Figure 1:
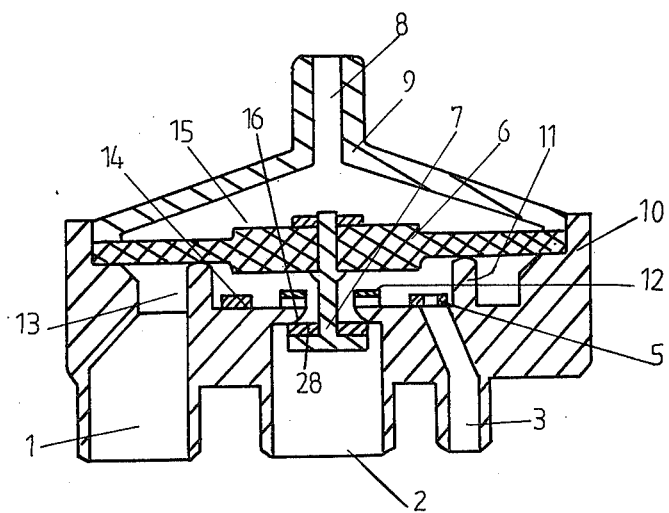

United States Patent [19]

Phillips

[11] 4,212,325
[45] Jul. 15, 1980

[54] PULSATOR VALVES

[76] Inventor: Evan M. Phillips, 26 Acacid Crescent, Hamilton, New Zealand

[21] Appl. No.: 896,094

[22] Filed: Apr. 13, 1978

[30] Foreign Application Priority Data

Mar. 25, 1977 [NZ] New Zealand .................. 183700

[51] Int. Cl.² .............................................. A01J 5/12
[52] U.S. Cl. ............................... 137/627.5; 137/614.2; 137/DIG. 8; 119/14.44
[58] Field of Search ...................... 137/106, 513.3, 613, 137/614.2, 627.5, DIG. 8; 119/14.36, 14.37, 14.39, 14.44, 14.55

[56] References Cited

U.S. PATENT DOCUMENTS

| | | | |
|---|---|---|---|
| 2,896,573 | 7/1959 | Schlam | 119/14.55 X |
| 3,759,226 | 9/1973 | Rudle | 119/14.55 X |
| 4,033,295 | 7/1977 | Soderlund | 119/14.44 |

FOREIGN PATENT DOCUMENTS

| | | | |
|---|---|---|---|
| 244431 | 10/1960 | Australia | 137/103 |
| 102996 | 11/1965 | Denmark | 119/14.44 |

*Primary Examiner*—Robert G. Nilson
*Attorney, Agent, or Firm*—Holman & Stearn

[57] ABSTRACT

A pulsator valve for a milking machine is disclosed which includes a pressure-limiting restriction applied to the air passage at an output connection to the teet cups. The pulsator is provided with a valve member of substantially flat annular form arranged to seat on an annularly surfaced valve seat within the pulsator valve and the pressure-limiting restriction is an orifice within this valve member arranged to seat downwardly on a valve seat around the output connection during outward airflow from the pulsator valve so that the orifice is aligned with the output connection.

4 Claims, 2 Drawing Figures

PULSATOR VALVES

This invention relates to pulsator valves and has been devised particularly though not solely as a pulsator valve for a milking machine.

The pulsator valve used in a milking machine is a pneumatic switch designed to connect an output port alternately to a source of vacuum and to atmospheric air. Pulsator valves have a range of forms from mechanically operated slide valves to electrically driven piston or plate valves.

A necessary requirement for successful operation of a pulsator valve without excessive leaking during the switchover between air pressure and vacuum is that the pressures inside the pulsator are not greatly influenced by the air flow during the switchover period. If the air entry port is unduly restricted the pressure below the valve unit causing switching to take place can change sharply to a lower level as air flow takes place at the start of the switch phase. Under these conditions the valve will pause during the switchover until the master pulsation has progressed to a later point in the wave form. If the pressure inside the pulsator is allowed to change during switchover the valve movement can be delayed for a period during which air passes through both valve seats directly from the air port to the vacuum port. This will not give a sharp cutover which is desired from a pulsator valve.

It is common practice with some milking machines to use a restriction in the air supply port to allow the rate at which the liner collapses onto the cows teat to be more gentle. This has usually been achieved by using small holes to restrict air entry to the valve system. This method has the disadvantage that it causes a drop in pressure on the air pressure side of the valve system as soon as air commences flowing through the restriction holes.

To prevent excessive leaking through the valve system during switchover it is necessary to use a small valve travel between the seats, a near square wave master control pulse, and a limited amount of restriction to the air entry. These factors are often difficult to provide under operational conditions. This means that any variation in manufacturing tolerances in valve clearance can result in serious air leaks (or excessive restriction of the output wave form if valve travel is too little). The construction must therefore be made to close tolerances if these units are to be successful. The master control pulse must be reasonably square wave and leaks into the master control line can seriously affect operation. In use it has been found that the master pulse must be renewed at intervals along the milking shed by using boosters. Only limited control of the rate of application of the air phase is possible if pulsators are to be reliable.

It is therefore an object of the present invention to provide a pulsator valve which will at least provide the public with a useful choice.

Accordingly the invention consists in a milking machine pulsator valve having a pressure limiting restriction applied to the air passage at output connection to the teat cups. To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

Figure 2:
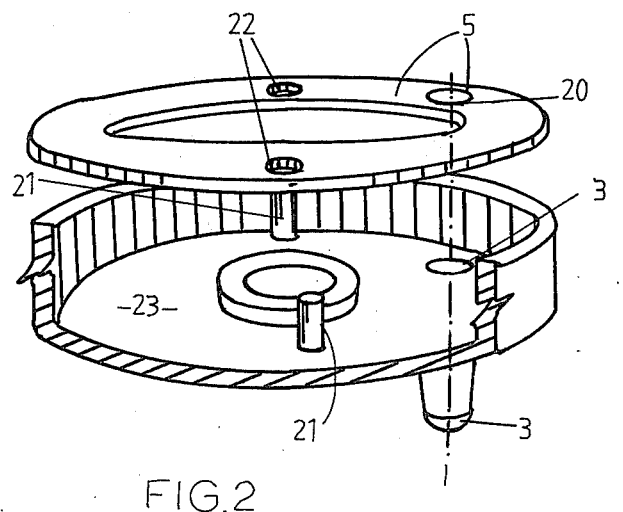

One preferred form of the invention will now be described with reference to the accompanying drawings in which, FIG. 1 is a cross-sectional elevation of a pulsator valve incorporating a restriction according to the invention, and FIG. 2 is an exploded perspective scrap view of parts of the pulsator valve shown in FIG. 1.

In the preferred form of the invention a pulsator valve incorporating a restriction in the air passage to the teat cups is constructed as follows.

The valve is provided with a body which comprises a base portion 10 and a cap portion 9 which are preferably moulded from a suitable plastics material. The valve incorporates a diaphragm 6 made from a synthetic rubber such as neoprene or from a natural rubber or flexible plastics material and which is rim mounted by the diaphragm edge between the body 10 and cap 9. Both the valve body and the diaphragm are substantially circular in plan view. The valve body incorporates an internal valve 7 having a valve face 28 which engages with a seat 16 and which is operable by way of a rod by the movement of the diaphragm 6.

The arrangement and use of the valve when arranged as a simple 'reversing' slave pulsator valve is as follows.

Diaphragm 6 which when at rest normally will contact annular valve seat 11 is held down onto valve seat 11 and deflected to stop 12 by vacuum on its underside because port 8 is connected to atmospheric pressure. Port 3 connects the teat cup outer cavity to 'vacuum' supplied through port 2 by means of the opening between valve 7 and valve seat 16. When a vacuum signal from a 'master' or other source is applied to chamber 15 via port 8 this will balance the vacuum applied to the underside of diaphragm 6 over the area bounded by annular seat 11 and the diaphragm 6 will lift off stop 12 closing valve 7 against seat 16. Port 3 is connected to the teat cup and at this point is closed off to both vacuum and atmospheric pressure.

Since the signal vacuum applied through port 8 to chamber 15 is operating over the whole upper surface area of diaphragm 6 will flex in an annular manner lifting off seat 11 and tending to form a catenary curve between its centre and outer periphery connecting port 3 by chamber 14 to chamber 13 and port 1 allowing air at atmospheric pressure to pass through to port 3. When the signal vacuum is removed from port 8 and atmospheric air allowed to enter the pressure in chamber 15 will rise allowing diaphragm 6 to flex back into contact with seat 11 thus interrupting the connection between chambers 13 and 14, disconnecting the teat cup outer cavity from atmospheric pressure. At this point teat cup port 3 is closed momentarily to both vacuum and atmospheric pressue.

The system vacuum operating on the underside of valve 7 will then draw the valve down away from seat 16 and the diaphragm 6 down onto stop 12. The vacuum supply will then again be coupled to the teat cup outer cavity by the space between valves 7 and seat 16 to chamber 14 and port 3.

It will be seen that at both times when changing from one position to the other the diaphragm flexes to ensure that both vacuum and atmospheric air pressures are closed off before either one is connected to the teat cup outer cavity. Also the wave form of the 'signal' or the rate of application of the signal to port 8 will not affect the 'sharpness' of the output pulse as this is entirely dependent upon the action of the diaphragm 6 when suitable pressure conditions have been reached between its upper and lower surfaces.

When the pulsator so described is to be operated in a slow squeeze mode, i.e., outward air flow from port 3 is to be restricted, it is necessary to provide a suitable restriction which is effective when air is passing outwardly through port 3 and will not unduly restrict inwards air flow through this port. To achieve this feature annular valve ring 5 with orifice 20 coinciding with the location of port 3 is provided to lie against the lower internal surface 23 of cavity 14. Valve ring 5 may be prevented from shifting from its desired location while still being free to lift up and down by suitable guide pins 21 operating in holes 22 (FIG. 2).

When air is to pass outwardly from port 3 the force of gravity assisted by the air flow will settle the valve ring 5 against surface 23 in which position suitably sized orifice or hole 20 will coincide with port 3 to restrict outwards air flow. When air flows inwards, resistance to this flow by orifice 20 will lift valve ring 5 away from surface 23 and inwards air flow will continue relatively unimpeded.

It will be seen that outward air flow through port 3 may be controlled by suitable restrictions without the need to restrict air inlet to cavity 14. As a result of this arrangement the basic action of the pulsator is not inhibited as it may be if restriction is applied to air inlet port 1 in the conventionally known arrangement for a pulsator valve.

It will be apparent that although the invention has been described for use in a pulsator valve incorporating a diaphragm the ring check valve 5 may equally well be incorporated in pulsator valves of different types. For example, the ring check valve may be used in shuttle or spool type pulsator valves or in any other application where it is desired to control the squeeze mode of the teat cup by restricting the air flow.

I claim:

1. A milking machine pulsator valve having a pressure limiting restriction applied to the air passage at output connection to the teat cups wherein a valve member is provided comprising a substantially flat annular member arranged to seat on an annularly surfaced valve seat within said pulsator valve and wherein said pressure limiting restriction comprises an orifice of predetermined size within said valve member arranged to seat downwardly on a valve seat about said output connection during outward air flow from said pulsator valve, so that said orifice is aligned with said output conenction.

2. A milking machine pulsator valve as claimed in claim 1 wherein said valve member is located within said pulsator by way of guide members in the form of pins from said annular surface and engaged with holes or locating notches in said valve member.

3. A milking machine pulsator valve as claimed in claim 1 wherein said valve member is actuated by a diaphragm mounted in a body, said diaphragm engaging an annular valve in said body to act as a further valve.

4. A milking machine pulsator valve comprising a body a diaphragm held in said body said diaphragm having one side exposed in use to alternating atmospheric pressure and a reduced pressure (vacuum) an air inlet to an outer chamber on the opposite side of said diaphragm an annular valve seat in said body with which part of said diaphragm coacts to separate said outer chamber from an inner chamber a vacuum supply to said inner chamber, a valve member actuated by said diaphragm to move onto or away from a valve seat to control admission of vacuum to said inner chamber a teat cup pulsation connection to said inner chamber and a movable restriction movable from a position in which the movable restrictor restricts flow of air from said inner chamber to said connector and a position in which flow of air from said connection to said inner chamber is substantially unrestricted.

* * * * *